Mar. 3, 1925. 1,528,003
F. P. YARNALL
FLOATING OUTLET FOR TANKS
Filed Oct. 11, 1922
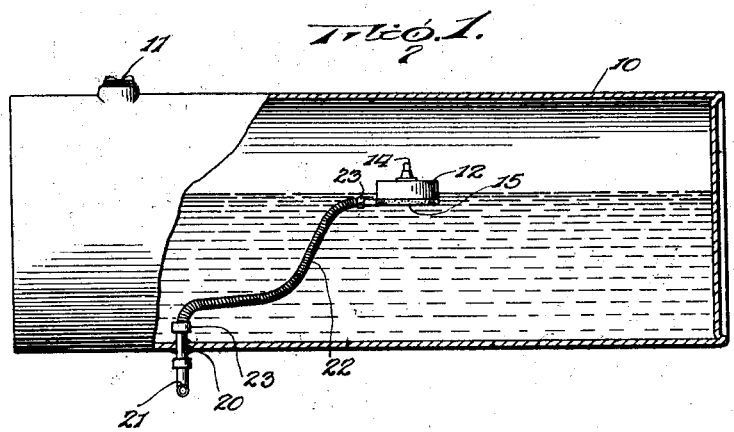
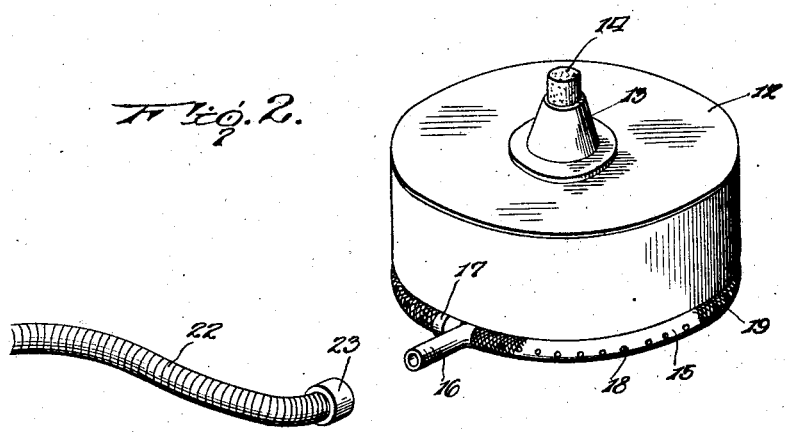
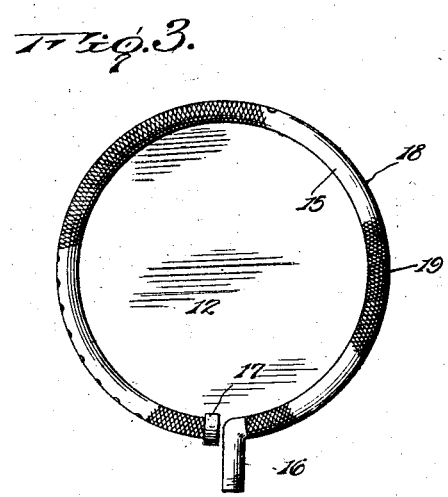
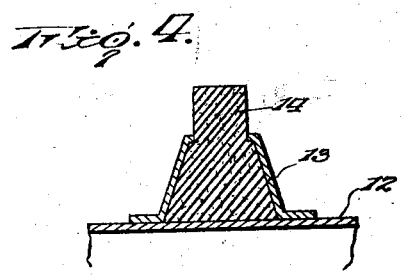
Inventor
F. P. Yarnall.
By Lacey & Lacey, Attorneys

Patented Mar. 3, 1925.

1,528,003

UNITED STATES PATENT OFFICE.

FRANK P. YARNALL, OF BELFORD, NEW JERSEY.

FLOATING OUTLET FOR TANKS.

Application filed October 11, 1922. Serial No. 593,779.

*To all whom it may concern:*

Be it known that I, FRANK P. YARNALL, citizen of the United States, residing at Belford, in the county of Monmouth and State of New Jersey, have invented certain new and useful Improvements in Floating Outlets for Tanks, of which the following is a specification.

This invention relates to an improved floating outlet for tanks, being adapted for use in connection with water tanks, motor vehicle fuel tanks, or the like, and seeks, as one of its principal objects, to provide a device which will prevent the outflow of sediment in the tank.

The invention has as a further object to provide a device which, when employed in connection with a motor vehicle fuel tank, will also prevent the outflow of any water settled at the bottom of the tank.

And the invention has as a still further object to provide a device which will be simple in construction, efficient in operation, and which may be readily installed.

Other and incidental objects will appear hereinafter:

In the drawings:

Figure 1 is a view showing my improved device in conjunction with a motor vehicle fuel tank, Figure 2 is a detail perspective view particularly showing the float shell and outlet strainer employed, Figure 3 is a bottom plan view of the float shell and strainer, and Figure 4 is an enlarged sectional view particularly showing the bumper carried by the float.

While, as previously intimated, my improved floating outlet is, as will be better appreciated as the description proceeds, adapted for a wide range of use, I have, in the present instance, shown the device in conjunction with a motor vehicle fuel tank embodying a cylindrical casing 10 having the usual filling opening normally closed by a cap 11. As is well known, a great deal of trouble is at present experienced in conjunction with the operation of internal combustion engines due to the presence of more or less water in the engine fuel. The water being of greater specific gravity than the fuel, settles to the bottom of the engine fuel tank with the result that the water flows into the engine carbureter and seriously interferes with the functioning thereof. The present invention, therefore, seeks to overcome these difficulties.

In carrying the invention into effect, I employ a float embodying a sealed disc-shaped shell 12 of metal or other approved material and suitably mounted upon the upper side of the shell centrally thereof is a frusto conical socket 13. Engaged in said socket to project thereabove is a yieldable bumper 14 of leather, rubber or the like. Soldered or otherwise secured to the periphery of the shell at its lower side is a strainer pipe 15 providing a weight at the bottom of the shell and, as brought out in Figure 3, this pipe is bent into circular shape conforming to the outline of the shell for distributing the weight of the pipe circumferentially of the shell so that the shell will be properly balanced when floating upon a liquid. Near one end, the pipe is bent to define a laterally directed nipple 16 while at its opposite end the pipe is closed by a cap 17 and formed in the pipe at its outer circumference is an annular series of spaced minute openings 18. Appropriately secured to the pipe to overlie said series of openings is a wire gauze 19.

In mounting the device, I equip the tank 10 at the bottom thereof with a double-ended nipple 20, although this nipple may be installed upon an end wall of the tank, and connected to the outer end of the nipple is the usual feed pipe 21 leading to the carbureter of the vehicle engine. Connecting the strainer pipe 15 of the float with said nipple at its inner end is a flexible outlet pipe or armored hose 22 provided at its ends with couplings 23, one threaded upon the nipple 16 of said pipe and the other threaded upon the inner end of the nipple 20. Thus, as will be seen, the float will, as suggested in Figure 1, ride upon the body of fuel in the tank for supporting the strainer pipe 15 submerged immediately beneath the upper surface of the fuel, the flexible pipe 22 permitting the float to rise and fall as the level of the fuel in the tank is raised or lowered. Accordingly, fuel will be drawn through the strainer pipe 15 from near the surface of the fuel so that any sediment or water at the bottom of the tank will be prevented from entering said pipe. Furthermore, as the fuel is drawn through the pipe 15, the fuel will be strained by the gauze 19 so that any foreign particles floating in the fuel will also be prevented from entering the strainer pipe to cause clogging of the carbureter supply line or the carbureter itself. When the tank is filled so that the float is lifted to the top of the tank, the bumper 14 will prevent the float from banging against the wall of the tank incident to jolting of the tank. As will be understood, the nipple 20 may, of course, be mounted at the top of the tank to accommodate the requirements of a vacuum feed system. Furthermore, attention is directed to the fact that by coiling the pipe 15 to register with the circumference of the float shell, a maximum length of pipe to accommodate a correspondingly large number of protected inlet openings is provided.

Having thus described the invention, what is claimed as new is:

A floating outlet for supply tanks including an imperforate float, an apertured pipe carried by the lower end of the float and connected with a tank outlet, an upwardly tapered socket on the upper end of the float, and a bumper consisting of a solid body of yieldable material fitted in and completely filling said socket to be held thereby and projecting through the top of the same.

In testimony whereof I affix my signature.

FRANK P. YARNALL. [L. S.]